United States Patent [19]

Mills et al.

[11] Patent Number: 4,611,358
[45] Date of Patent: Sep. 16, 1986

[54] DEVICE FOR TUBE CUTTING, REAMING AND BENDING

[76] Inventors: Mark Mills, 50 Rena Ave.; Darrell Mills, 33 Mindy Ct., both of Erie, Pa. 16510

[21] Appl. No.: 721,441

[22] Filed: Apr. 9, 1985

[51] Int. Cl.⁴ .................................................. B25F 1/00
[52] U.S. Cl. ............................................. 7/157; 72/477
[58] Field of Search ..................... 7/157; 72/459, 477

[56] References Cited

U.S. PATENT DOCUMENTS

| | | | |
|---|---|---|---|
| 2,804,791 | 9/1957 | Wheeler | 72/459 |
| 3,522,617 | 8/1970 | Kowal | 7/157 |
| 3,849,881 | 11/1974 | Strybel | 7/157 X |
| 4,442,695 | 4/1984 | Gardner | 72/459 |

*Primary Examiner*—James G. Smith
*Attorney, Agent, or Firm*—Wayne L. Lovercheck; Charles L. Lovercheck; Dale R. Lovercheck

[57] ABSTRACT

The hand held device of the invention is adapted for cutting, reaming and bending tubing. The device includes as discussed above a bender body member having a tubing guide track, a bender bracket having a bender flange, a rotatable cutting wheel, and a reaming tool. The bender bracket is connected to the bender body member. The reaming tool is connected to the bender body member. The rotatable cutting wheel is supported by the body member. The bender flange is positioned above the tubing guide track so that tubing fed beneath the bender flange is held by the bender flange as the tubing is bent into the tubing guide track. The upper work surface of the tubing guide track is semicircular in cross section. The tubing guide track is arced. The bender flange has a tubing engaging portion which is semicircular in cross-section. A work portion of the tubing is positioned in the tubing guide track beneath the tubing engaging portion of the bender flange. The operator then bends the tubing into the tubing guide track by forcing the tubing toward the tubing guide track. The force is applied at a point adjacent to the tubing guide track and at the end of the track opposite to the bender flange.

20 Claims, 9 Drawing Figures

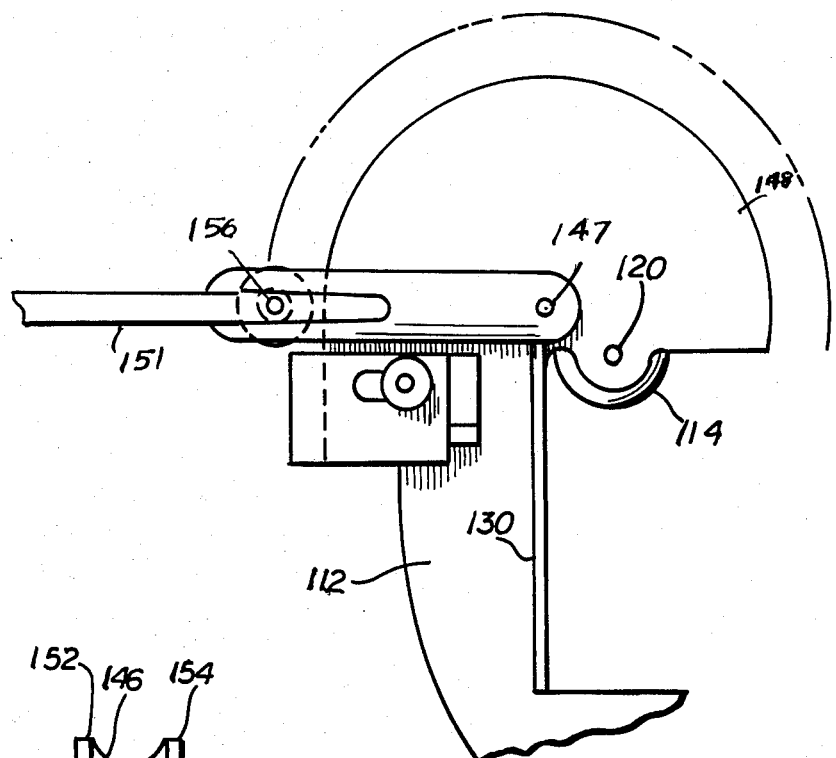
FIG. 4
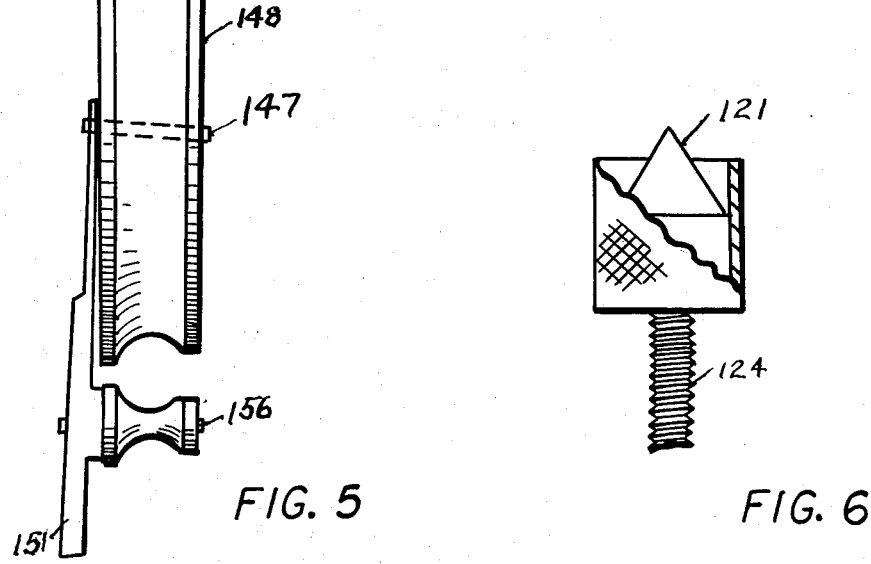
FIG. 5
FIG. 6

DEVICE FOR TUBE CUTTING, REAMING AND BENDING

BACKGROUND OF THE INVENTION

The invention relates to a hand held device for cutting, reaming and bending tubing. The invention provides a device which is easy to use and useful for forming tubing into curved shapes, including helical shapes. The improvements of the invention each taken alone or in combination add to provide benefits not available in the devices of the prior art.

Guzda in U.S. Pat. No. 3,847,189 discloses a wire cutting and bending tool having two handles and an inner and an outer die base. The inner die base has a cylindrical surface connected to one of the handles. The outer die base has a cylindrical shell welded to the other handle.

Wright in U.S. Pat. No. 3,022,575 discloses a typical tubing cutter having a reaming tool fixed to the body. The tool has a C-shaped body. The cutter wheel is supported by a slidably journalled cutter wheel support.

Schlueter in U.S. Pat. No. 2,878,550 discloses another combination tube cutter.

Dean in U.S. Pat. No. 1,244,299 discloses a pipe cutter and coupling splitter tool.

McIntosh in U.S. Pat. No. 2,637,227 discloses a tube working tool having a cutter and a reamer.

Adams in U.S. Pat. No. 635,220 discloses a combination pipe cutter and hacksaw.

Dahl in U.S. Pat. No. 2,057,014 discloses a gauge for nipple cutters.

One problem of the prior art is that no hand held device is provided which can bend tubing into a helical shape. Another problem of the prior art is that no hand held device is provided which can cut, ream and bend tubing. The improvements of the present invention benefically provide a novel, nonobvious and useful manner of cutting, deburring and bending tubing.

BRIEF DESCRIPTION OF THE INVENTION

These problems of the prior art are overcome by the improved hand held device of the present invention. In accordance with the present invention a convenient and economical device is disclosed which is adapted for cutting, reaming and bending tubing.

The hand held device of the invention is adapted for cutting, reaming and bending tubing. The device includes as discussed herein below a bender body member having a tubing guide track, a bender bracket having a bender flange, a rotatable cutting wheel, and a reaming tool. The bender bracket is connected to the bender body member. The reaming tool is connected to the bender body member. The rotatable cutting wheel is supported by the body member. The bender flange is positioned above the tubing guide track so that tubing fed beneath the bender flange is held by the bender flange as the tubing is bent into the tubing guide track. The upper work surface of the tubing guide track is semicircular in cross section. The tubing guide track is arced.

The bender flange has a tubing engaging portion which is semicircular in cross section. The portion of the tubing to be bent is positioned in the tubing guide track beneath the tubing engaging portion of the bender flange. The operator then bends the tubing into the tubing guide track by forcing the tubing toward the tubing guide track. The force is applied at a point adjacent to the tubing guide track and at the end of the track opposite to the bender flange.

Preferably, the arc of the tubing guide track is a partial helix, so that tubing bent into the tubing guide track is offset forming bent tubing which is at least partially helical.

BRIEF DESCRIPTION OF THE DRAWINGS

The objects, features and advantages of the present invention will become more fully apparent from the following detailed description of the preferred embodiment, the appended claims and the accompanying drawings in which:

FIG. 4 is a partial side view of another embodiment of the invention.

FIG. 5 is a front view of a part of the tubing cutter of FIG. 4.

FIG. 6 is a part of the tubing cutter of FIGS. 4 and 5.

DETAILED DESCRIPTION OF THE PREFERRED EMBODIMENT

Figures 1, 2:
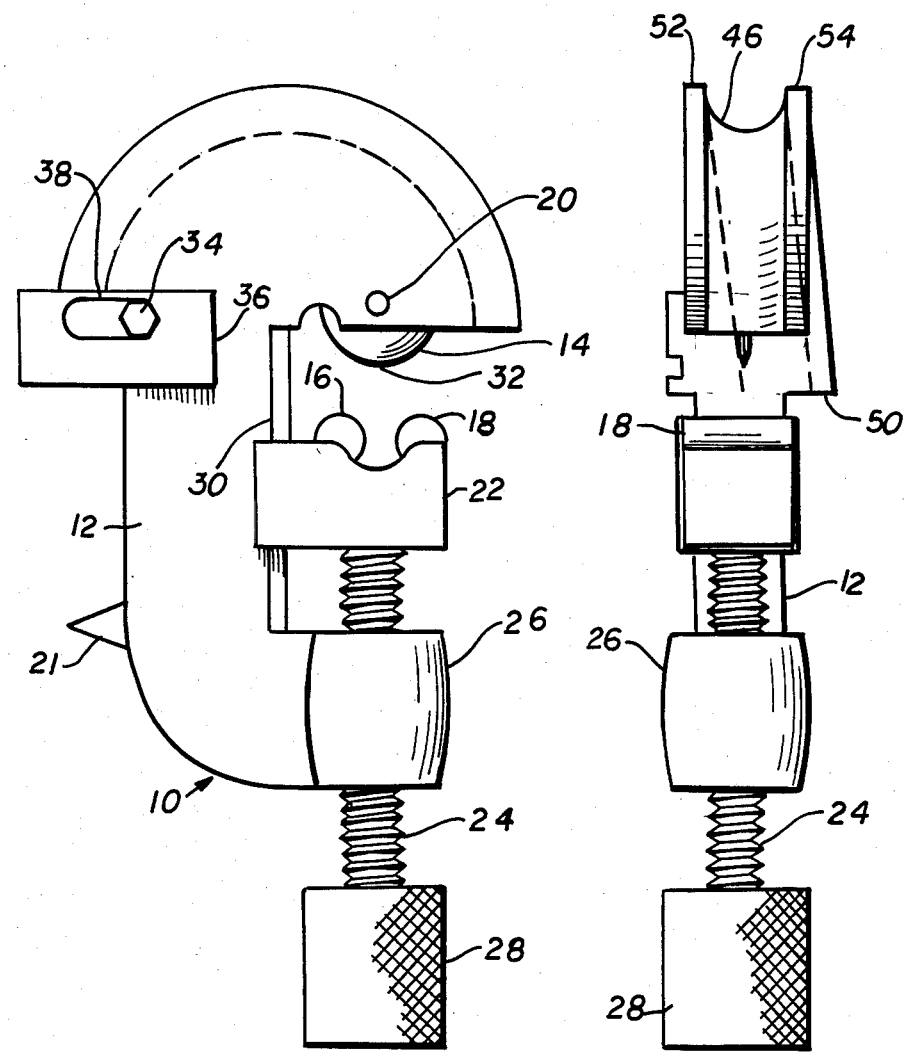
FIG. 1 is a side view of a hand held device for cutting, reaming and bending tubing in accordance with the invention.
FIG. 2 is a frontal view of the body member of a hand held device for cutting, reaming and bending tubing in accordance with the invention.
Figure 3:
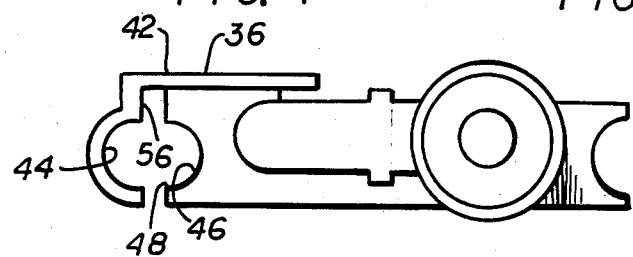
FIG. 3 is a bottom view of a hand held device for cutting, reaming and bending tubing in accordance with the invention.

The preferred embodiment of the invention is illustrated by way of example in FIGS. 1-3. Referring to the Figures, in which like numerals refer to like portions thereof FIG. 1 shows one embodiment of a hand held device 10 for cutting, reaming and bending tubing in accordance with the present invention. The device 10 includes a body member 12. Body member 12 supports rolling cutter 14 located above guide rollers 16 and 18. Rolling cutter 14 is connected to axle 20 which is supported by body member 12. Reaming tool 21 is connected to body member 12.

Guide rollers 16 and 18 are connected to roller support body 22. Roller support body 22 is connected to threaded rod 24. Threaded rod 24 is threaded through threaded body portion 26. Handle 28 is connected to threaded rod 24. The handle 28 is adapted to be rotated to move the roller support body 22 toward or away from rolling cutter 14. As the roller support body 22 is moved toward rolling cutter 14, it is guided by roller support guide ways 30. Roller support guide ways 30 guide the central axis of the threaded rod 24 toward rolling cutter 14, bringing the rollers 16 and 18 toward the rolling cutter 14 and the cutting edge 32 of the rolling cutter 14. Bracket position adjustment bolt 34 is connected to body member 12. Bracket position adjustment bolt 34 holds bender bracket 36 to body member 12. Bender bracket 36 has an aperture defined by bracket positioner aperture wall 38 which contacts bracket position adjustment bolt 34. The bender bracket 36 is held in position by the bracket position adjustment bolt 34.

For large diameter tubing the bracket position adjustment bolt 34 is loosened and the bender braket 36 is positioned with the bracket position adjustment bolt 34 at the end of the aperture most distant from the inner member 48. This allows the large diameter tubing to be fed between the bender flange work face 44 and tubing guide track work face 46.

With more particular reference to FIG. 2, it is seen that the tubing guide track 48 is offset along flange 50. Flange 50 offsets the tubing as it bends to form a helically shaped tubing product.

Shoulders 52 and 54 of the body member 12 follow the tubing guide track 46. The bender flange work face 44 is adapted to be positioned against the surface of shoulders 52 and 54.

Now with regard to the embodiment of the invention shown in FIGS. 4, 5 and 6, I show a tubing cutter having a guide 130. The body member 112 will have a roller support similar to the body support 22 in the embodiment of FIG. 1. The body 112 will have a half circular disk 148 with a groove 146, a long flange 152 and a short flange 154. The pin 156 will be inclinded at an angle equal to the angle of the bending groove 146. A roller 150 will be pivoted to the handle 151 by pin 156. The pin 156 may be disposed at an angle 90° to the arm 151.

To use this embodiment of the invention the operator will lay the tubing in the groove 146 and swing the handle 151 around thereby drawing the tubing around the arc of the half circle 148. The bender bracket 136 will be made similar to the bender bracket 36 in the embodiment of FIGS. 1, 2 and 3. Threaded rod 124 is received in a threaded hole in body 112 and a pipe reamer 121 is supported on the end of rod 124.

Figures 7, 8:
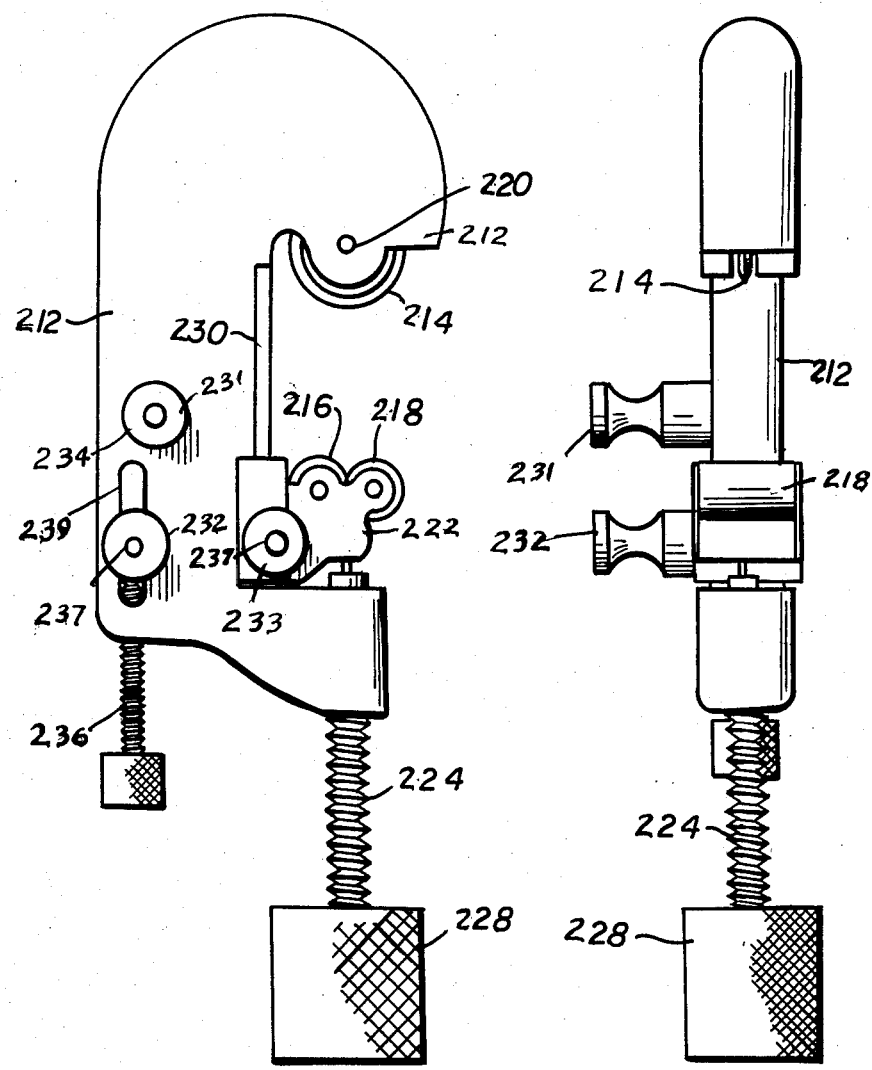
FIG. 7 is a front view of another embodiment of the invention.
FIG. 8 is a front view of the tubing cutter of FIG. 7.
Figure 9:
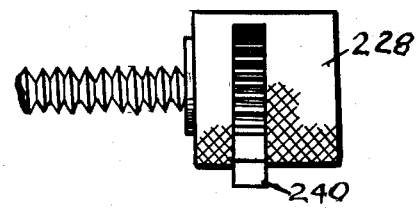
FIG. 9 is a view of another embodiment of the invention.

Now with reference to the embodiment of the invention shown in FIGS. 7, 8 and 9, I show a tubing bender having a body 212 with a roller carrier 230 on the body slidable on ways 230 and a threaded rod 224 threadably engaging the body 212 as in the embodiment of FIGS. 1 and 2. The rollers 216 and 218 are supported on the roller carrier 222 and a cutter wheel 214 is provided rotatably supported on the pivot 220. The side edge of the tubing cutter has bending rollers 231, 232 and 233. The roller 231 is pivoted to the body 212 by pivot 234. The roller 232 is supported on the screw 236 by pivot pin 231 which extends through slot 239. The roller 233 is supported on the roller carrier 222 by pivot pin 237. Roller 232 can be adjusted for optimum position for different radius bends. The roller 232 can be moved to the roller 231 by means of a screw 236 to adjust the curvature of the tube bend and roller 233 moves with roller carrier 222. A reamer blade 240 is attached to handle 240.

OPERATION

The hand held device of the invention is adapted for cutting, reaming and bending tubing. The operator may use the device for any or all of these functions. The device includes as discussed above a body member having a tubing guide track, a bender bracket having a bender flange, a rotatable cutting wheel, and a reaming tool. The bender bracket is connected to the body member. The bender flange is positioned above the tubing guide track so that tubing fed beneath the bender flange is held by the bender flange as the tubing is bent into the tubing guide track. The upper work surface of the tubing guide track is semicircular in cross section and the tubing guide track is arced. The bender flange has a tubing engaging portion which is semicircular in cross section. This provides substantial and effective support for the tubing against the guide track and the bender flange.

The portion of the tubing to be bent is positioned in the tubing guide track beneath the semicircular tubing engaging portion of the bender flange. The operator then bends the tubing into the tubing guide track by forcing the tubing toward the tubing guide track. The force is applied at a point adjacent to the tubing guide track and at the end of the track opposite to the bender flange.

Preferably, the arc of the tubing guide track is a partial helix. As the tubing is bent into the helical tubing guide track, the tubing is offset to form helical tubing product.

The, preferably clockwise, rotation of the threaded rod moves the pair of rollers up to hold the tubing to be cut against the cutting edge of the rolling cutter. The operator then rotates the device around the tubing while pushing and/or pulling the handle. As the device turns the tubing is cut. After the tubing is cut, the two cut tubings are ready for reaming if a burr has formed and the operator rotates the threaded rod to move the pair of rollers down to receive the next tubing to be cut.

The burr at the cut opening can now be reamed out by the reamer 21. The operator inserts the reaming tool into the cut opening of the tubing and rotates the device. This removes any burr from the cut opening of the tubing.

The order in which the tubing is cut, bent and reamed is not critical. The device of the invention can be used for bending, cutting and reaming sequentially a length of tubing. Alternatively, the device can be used for bending, cutting or reaming alone.

Tubing products formed with the device of the invention can be bent into helical lengths by using a device with a helical tubing guide track. Alternatively, a tubing product can be formed the length of which is in a single plane by using a device with a semicircular (nonhelical) tubing guide track.

The tubing worked on using the device of the invention can be of any material useful for making tubing, for example, copper, iron, steel or plastic (for example thermoplastic such as polyethylene, polyproplyene and polystyrene). These cut, reamed and/or bent lengths of tubing can be joined to various tubing fittings, valves and other lengths of tubing to form a conduit system.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. A hand held device for cutting and bending tubing comprising:
   a bender body member having a first end, a second end and a tubing guide track supported on said first end,
   a bender bracket having a bender flange, and
   a rotatable cutting wheel,
   said bender bracket being adjustably connected to said bender body member adjacent said first end,
   said rotatable cutting wheel being supported by said bender body member adjacent said first end,
   roller means, a roller support rotatably supporting said roller means on said body adjacent said second end thereof and adjacent said cutter wheel for cutting tubing, said bender flange being positioned adjacent to said tubing guide track whereby tubing fed between said bender flange and said tubing guide track is held by said bender flange as said tubing is bent into said tubing guide track.

2. The hand held device for cutting and bending tubing of claim 1 wherein said tubing guide track is in the form of an arc.

3. The hand held device for cutting and bending tubing of claim 2 further comprising a reaming tool, said reaming tool being connected to said bender body member.

4. The hand held device for cutting and bending tubing of claim 2 wherein said arc of said tubing guide track is helical, whereby tubing bent into said tubing guide track is formed into a helix.

5. The hand held device for cutting and bending tubing of claim 1 wherein said bender flange has a semicircular portion, said semicircular portion being positioned adjacent to said tubing guide track, whereby tubing fed between said bender flange and said tubing guide track is held by said semicircular portion of said bender flange as said tubing is bent into said tubing guide track.

6. The hand held device for cutting and bending tubing of claim 1 wherein said body member further comprises a threaded body portion adjacent said second end and said device further comprises a threaded rod, said threaded rod extending through and being supported by said threaded body portion.

7. The hand held device for cutting and bending tubing of claim 6 wherein said roller means comprises a pair of rollers, said pair of rollers being supported by said roller support, and said roller support being connected to said threaded rod, said pair of rollers being positioned adjacent to said rotary cutting wheel, said threaded rod being adapted to move said roller support closer to and farther away from said rolling cutter, said pair of rollers being adapted to hold said tubing against said rolling cutter.

8. A hand held device for cutting, reaming and bending tubing, comprising:

a body member having a first end and a second end and having a tubing guide track extending around said first end, a bender bracket having a bender flange supported adjacent one end of said track, a rotatable cutting wheel, means supporting said wheel on said body, a roller support on said body, guide rollers on said roller support, means to adjust said guide rollers toward and away from said cutting wheel, a reaming tool, said bender bracket being adjustably connected to said body member, said reaming tool being connected to said body member, said rotatable cutting wheel being supported by said body member, said bender flange being positioned adjacent to said tubing guide track whereby tubing fed between said bender flange and said tubing guide track is held by said bender flange as said tubing is bent into said tubing guide track.

9. The hand held device for cutting, reaming and bending tubing of claim 8 wherein said tubing guide track is in the form of an arc.

10. The hand held device for cutting reaming and bending tubing of claim 9 wherein said arc of said tubing guide track is in the form of a helix, whereby tubing bent into said tubing guide track is offset forming bent tubing which is helical.

11. The hand held device for cutting and bending tubing of claim 8 wherein said bender flange has a semicircular portion, said portion, semicircular in cross section and being positioned adjacent to said tubing guide track, whereby tubing fed between said tubing guide track and said bender flange is held by said bender flange as said tubing is bent into said tubing guide track.

12. The hand held device for cutting, reaming and bending tubing of claim 8 wherein said body member further comprises a threaded bore, and said device further comprises a threaded rod, said threaded rod extending through and being supported by said threaded bore.

13. The hand held device for cutting, reaming and bending tubing of claim 12 futher comprising a roller support and a pair of rollers, said pair of rollers being supported by said roller support, and said roller support being connected to said threaded rod, said pair of rollers being positioned adjacent to said rolling cutter, said threaded rod being adapted to move said roller support closer to and farther away from said rolling cutter, said pair of rollers being adapted to hold tubing against said rolling cutter.

14. A hand held device for cutting and bending tubing, comprising:

a bender body member having a tubing guide track with a work surface supported on it, a bender bracket having a bender flange, a rotatable cutting wheel on said body, guide rollers on said body, said work surface of said tubing guide track being semicircular in cross section, and said tubing guide track being in the form of an arc of a circle, said bender flange being positioned adjacent to said tubing guide track whereby tubing fed between said bender flange and said tubing guide track is held by said bender flange as said tubing is bent into said tubing guide track.

15. The hand held device for cutting and bending tubing of claim 14 wherein said body member further comprises a threaded body portion, and said device further comprises a threaded rod, said threaded rod extends through and is supported by said threaded body portion and tube engaging means supported on said threaded rod.

16. The hand held device for cutting and bending tubing of claim 15 further comprising a reaming tool, said reaming tool being connected to said bender body member.

17. The hand held device for cutting and bending tubing of claim 15 wherein said arc of said tubing guide track is helical, whereby tubing bent into said tubing guide track is offset forming bent tubing which is helical.

18. The hand held device for cutting and bending tubing of claim 15 further comprising a roller support and a pair of rollers,
   said pair of rollers being supported by said roller support,
   and said roller support being connected to said threaded rod,
   said pair of rolers being positioned adjacent to said rolling cutter,
   said threaded rod being adapted to move said roller support closer to and farther away from said rolling cutter,
   said pair of rollers being adapted to hold tubing against said rolling cutter.

19. The hand held device for cuttting and bending tubing of claim 18 wherein said threaded rod further comprises handle means,
   and said body member further comprises roller support guide means,
   said roller support engaging said roller support guide means.

20. The hand held device for cutting and bending tubing of claim 19,
   said bender flange having a tubing engaging portion,
   said tubing engaging portion of said bender flange being semicircular in cross-section,
   said tubing guide track and said tubing engaging portion of said bender flange being adapted to receive a work portion of tubing positioned therebetween, whereby said tubing is adapted to be bent into said tubing guide track by applying a force against said tubing at a point adjacent to said tubing guide track,
   said point being opposite from said bender flange.

* * * * *